March 13, 1956 R. E. FRASE 2,738,153
COMPOSITE PALLET
Filed March 29, 1952
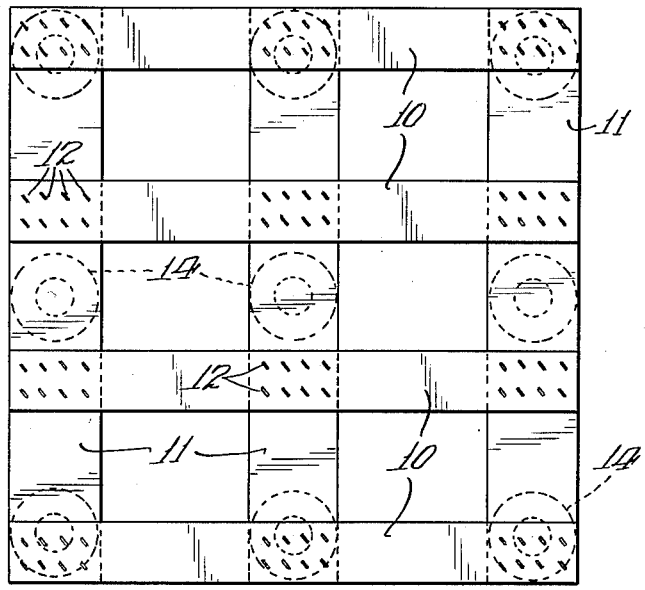
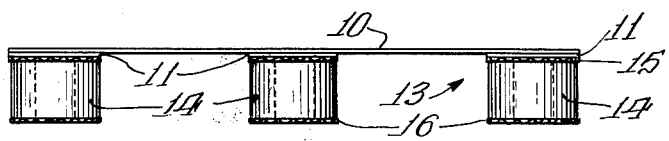
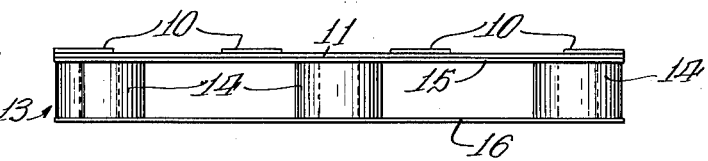
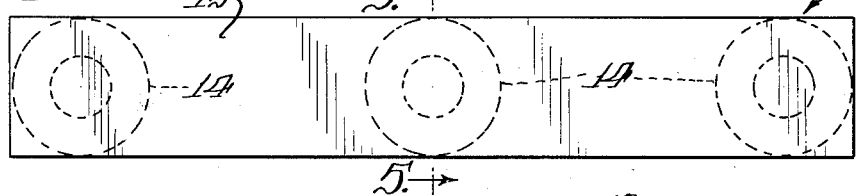
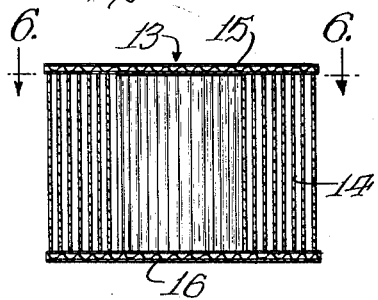
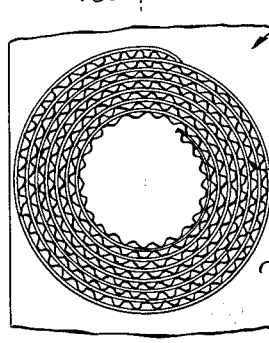
INVENTOR.
Raymond E. Frase
BY
Brown, Jackson, Boettcher & Dienner.
Attys.

United States Patent Office 2,738,153
Patented Mar. 13, 1956

2,738,153

COMPOSITE PALLET

Raymond E. Frase, Racine, Wis., assignor, by mesne assignments, to Signode Steel Strapping Company, Chicago, Ill., a corporation of Delaware Application March 29, 1952, Serial No. 279,418

1 Claim. (Cl. 248—120)

This invention relates to pallets for use with lift trucks in the handling and shipment of materials or merchandise in industrial operations.

In the Patent No. 2,432,295, issued December 9, 1947, to William T. Donahue, there is disclosed a pallet having a corrugated paperboard deck and corrugated paperboard supporting members or posts therefor. That pallet may be produced at such low cost that, after being used once, it may be disposed of without objectionable loss, the use of such disposable pallets effecting a substantial saving as compared to the use of wooden or metal pallets which are too expensive to be disposed of after being used but once and the return of which to their place of origin incurs substantial expense in respect to handling and shipping charges. Paperboard disposable pallets such as that disclosed in the above identified patent are now being used quite extensively and have proved to be quite satisfactory. Under certain conditions pallets with paperboard platforms or decks are not entirely satisfactory. In shipping bagged fluid or granular materials, such as starch, sugar, cement, etc., on pallets, there is a tendency for the bags or containers to cause sagging of the pallet deck between the supporting members or posts. That is particularly true if the loaded pallet is exposed to moisture for a considerable length of time, as by being left uncovered on a loading or a receiving platform or otherwise exposed to the elements. Under such conditions, the pallet deck may absorb moisture to such an extent as to become more or less softened, with the result that the loaded bags or containers cause sagging of the deck between the posts, the latter and the corresponding area of the deck tending to push upward into the load. Also, certain articles shipped on pallets, such as radiator grills, for example, may be curved upward so that they rest upon the deck of the pallet at two or more points spaced a substantial distance apart. In such cases, if the posts of the pallet are disposed between the points of contact between the article and the pallet deck, sagging of the deck between the posts is apt to occur, particularly if the paper deck of the pallet has absorbed a substantial amount of moisture. Sagging of the pallet deck is objectionable in that it may interfere with entry therebeneath of a lift truck, a hand truck or the forks of a fork truck, for raising and transporting the pallet and the load thereon. Further, sagging of the pallet deck in the manner stated tends, in some cases, to cause objectionable weakening thereof.

My invention is in the nature of an improvement of the pallet of the above identified patent and is directed to avoiding the above noted objections to that pallet under the conditions stated. It should be noted here that the pallet of the Donahue patent has proved to be highly satisfactory in all cases where the articles or containers loaded on the pallet are flat and possess sufficient rigidity to seat flatwise upon the pallet deck without tendency to bulge downward between the supporting posts. In order to guard against objectionable sagging of the pallet deck under the unfavorable conditions above mentioned, I provide a deck structure comprising load receiving members of substantially greater hardness and tensile strength than conventional or standard corrugated paperboard, and which possess much greater resistance to moisture than paperboard. More specifically, the deck of the pallet of my invention comprises rotary cut wood veneer strips secured together so as to provide a grill structure upon which the load rests. The deck, comprising the grill structure, is supported by paperboard units comprising rows of supporting members or posts, the posts of each row being tied together by a corrugated paperboard strip adhesively secured to the upper ends thereof and to the underface of the pallet deck. Certain of the strips of the grill structure of the deck correspond in width to the paperboard strips secured to the tops of the posts, and the latter strips underlie the strips of equal width of the grill structure, the corrugations of the paperboard posts being disposed perpendicular to the paperboard strips and the grill strips. That assures that the supporting posts are disposed beneath the relatively hard moisture resistant grill strips so that the pressure of the load is distributed along the grill strips, the latter being effective to prevent sagging of the deck or pushing of the posts upward into the load. The supporting posts and the associated paperboard strips preferably are made up in separate units each comprising a row of posts and paperboard strips of the same width as the posts secured to the tops and bottom thereof, tying the posts of each row together. That construction renders it feasible to ship the pallets in disassembled or knocked down condition, thereby effecting a substantial saving in shipping space and cost as compared to shipping the pallets completely assembled. The pallets in their disassembled or knocked down condition may readily be assembled at small cost at their place of use. In that connection, the strips of the deck grill structure which are of the same width as the paperboard strips of the supporting units serve as guides in properly locating the supporting units at the underface of the deck, so that by applying a suitable adhesive, such as sodium silicate, to the top strips of the supporting units and the underface of the corresponding strips of the grill structure, the pallet may readily be set up or assembled with expedition and facility and at small cost. Further objects and advantages of my invention will appear from the detail description.

In the drawings:

Figure 1 is a plan view of a pallet embodying my invention;

Figure 2 is a side view of the pallet of Figure 1;

Figure 3 is a side view of the pallet of Figure 1 taken at right angles to the view of Figure 2;

Figure 4 is a plan view, on an enlarged scale, of one of the deck supporting units;

Figure 5 is a sectional view, on an enlarged scale, taken substantially on line 5—5 of Figure 4; and Figure 6 is a sectional view taken substantially on line 6—6 of Figure 5.

Referring now to the drawings, my present invention comprises a grill structure preferably formed of a series of upper strips 10 disposed perpendicular to strips 11 of a lower series, upon which the strips 10 seat and to which they are suitably secured, conveniently by stitching in a stapling machine, as at 12. The strips 10 and 11 preferably are wood strips cut by a rotary veneer cutting machine and have a thickness of about 3/16 of an inch, the wood used being any suitable wood commonly used for that purpose and being cut with the grain extending lengthwise of the strips. Within the broader aspects of my invention, the grill structure may be formed of any other suitable material possessing the desired degree of hardness, tensile strength and resistance to moisture, as above indicated.

The deck, comprising the grill structure, is supported by a plurality of supporting units 13. Each of the units 13 comprises a row of supporting members or posts 14 tied together by top and bottom strips 15 and 16, respectively, of corrugated paperboard with the corrugations extending lengthwise thereof. The posts 14 also are formed of strips of corrugated board wound in a flat spiral or convolute to provide a cylindrical post the corrugations of which are disposed perpendicular to the strips 15 and 16, as shown more clearly in Figures 5 and 6.

It will be noted that the width of the paperboard strips 15 and 16 is approximately the same as the width or diameter of the posts 14, and that the width of the wood veneer strips 11 is approximately the same as the width of the top paperboard strips 15 of the supporting units 13. In setting up or assembling the pallet, the upper faces of the paperboard strips 15 of the units 13, or the underfaces of the strips 11 of the grill structure, or both, may be coated with a suitable adhesive, after which the strips 15 are held under appropriate pressure in contact with the underfaces of the strips 11 parallel therewith. A quick setting adhesive, such as sodium silicate, may be used, and as soon as the adhesive sets the pallet is completed, the supporting units 13 then being adhesively secured to the underface of the pallet deck in underlying parallel relation to the grill structure strips 11. By having the strips 11 of approximately the same width as the strips 15, the units 13 may be quickly and accurately positioned relative to the deck structure, which is conducive to expedition and facility in assembling the pallet.

In the use of the pallet, the articles or materials to be handled or shipped are placed upon the deck so as to be supported by the grill structure. The material of the grill structure possesses adequate tensile strength for supporting the load and, in addition, is resistant to moisture and of substantial hardness. Accordingly, the deck structure will not readily absorb moisture so as to be softened thereby, the load is distributed over the strips of the grill structure of the deck so that objectionable sagging of the deck is prevented, and the supporting posts will not push upward into the load, even though the top paperboard strips 15 of the supporting units 13 absorb a substantial amount of moisture.

It will be understood that changes in detail may be resorted to without departing from the field and scope of my invention, and I intend to include all such variations, as fall within the scope of the appended claim, in this application in which the preferred form only of my invention has been disclosed.

I claim:

In a pallet for handling and shipping merchandise having a load supporting platform comprising a plurality of parallel relatively rigid strips extending in one direction of the platform and a second plurality of parallel relatively rigid strips overlying and secured to said first strips and extending in a second direction of the platform to form a platform of grill structure, the improvement which comprises a plurality of platform supporting units each secured to the underside of one of the first named platform strips, each supporting unit comprising a plurality of corrugated paperboard posts with the corrugations thereof extending vertically, and a corrugated paperboard strip seating on and secured to the upper ends of said posts, the corrugations in said last named strip extending longitudinally thereof and said strip and posts having a width substantially equal to the width of the first named platform strips, each paperboard strip being substantially coextensive with one of the first mentioned platform strips and having its upper side adhesively secured to the underside of the respective platform strip, whereby the platform strips provide protection for said supporting units against moisture and whereby the pallet may be transported to the user with the platform and supporting units separate and assembled at the site of use.

References Cited in the file of this patent

UNITED STATES PATENTS

| | | |
|---|---|---|
| 2,432,295 | Donahue | Dec. 9, 1947 |
| 2,444,184 | Cahners | June 29, 1948 |
| 2,493,562 | Yarmon | Jan. 3, 1950 |
| 2,571,748 | Newman | Oct. 16, 1951 |
| 2,597,411 | Vankrimpen | May 20, 1952 |